(12) United States Patent
Nathoo et al.

(10) Patent No.: US 10,083,489 B1
(45) Date of Patent: Sep. 25, 2018

(54) PAYROLL CORRECTION

(71) Applicant: Square, Inc., San Francisco, CA (US)

(72) Inventors: Amir Nathoo, San Francisco, CA (US); James Colin Brady, San Francisco, CA (US); Caroline Hollis, San Francisco, CA (US); Connor H. Dunn, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/591,839

(22) Filed: Jan. 7, 2015

(51) Int. Cl.
*G06Q 10/10* (2012.01)
*G06Q 40/00* (2012.01)

(52) U.S. Cl.
CPC .................. *G06Q 40/125* (2013.12)

(58) Field of Classification Search
CPC ....... G06Q 20/02; G06Q 20/10; G06Q 40/125
See application file for complete search history.

(56) References Cited

U.S. PATENT DOCUMENTS

| | | | | |
|---|---|---|---|---|
| 4,819,162 A * | 4/1989 | Webb, Jr. | ............. | G06Q 10/109 235/377 |
| 6,347,306 B1 * | 2/2002 | Swart | ................... | G06Q 10/105 705/32 |
| 6,681,210 B2 * | 1/2004 | Kelly | ............... | G06Q 10/06398 705/30 |
| 6,764,013 B2 * | 7/2004 | Ben-Aissa | ........... | G06Q 20/341 235/385 |
| 7,229,013 B2 * | 6/2007 | Ben-Aissa | ......... | G06K 9/00087 235/380 |
| 7,464,859 B1 * | 12/2008 | Hawkins | ................ | G06Q 20/12 235/379 |
| 8,219,470 B1 * | 7/2012 | Brown | ................... | G06Q 40/12 705/30 |
| 8,326,714 B1 * | 12/2012 | Teichman | ............ | G06Q 10/105 705/32 |
| 2001/0044756 A1 * | 11/2001 | Watkins | ................ | G06Q 10/10 705/26.82 |

\* cited by examiner

*Primary Examiner* — Talia F Crawley
(74) *Attorney, Agent, or Firm* — Lee & Hayes, PLLC

(57) ABSTRACT

In some examples, a payment service may enable employees to be paid after every work shift. After a payroll payment for a first work shift, however, corrections to the amount of the payroll payment may be provided by the employer. When corrections reveal that an overpayment has occurred, at least a portion of the overpayment is deducted from the payroll payment for a second work shift that is subsequent to the first work shift. In some cases, the entire overpayment may be deducted from the payroll payment for the second work shift. In other cases, the overpayment may be deducted in installments from each of multiple subsequent payroll payments, which correspond respectively to work shifts that are subsequent to the first work shift.

19 Claims, 6 Drawing Sheets

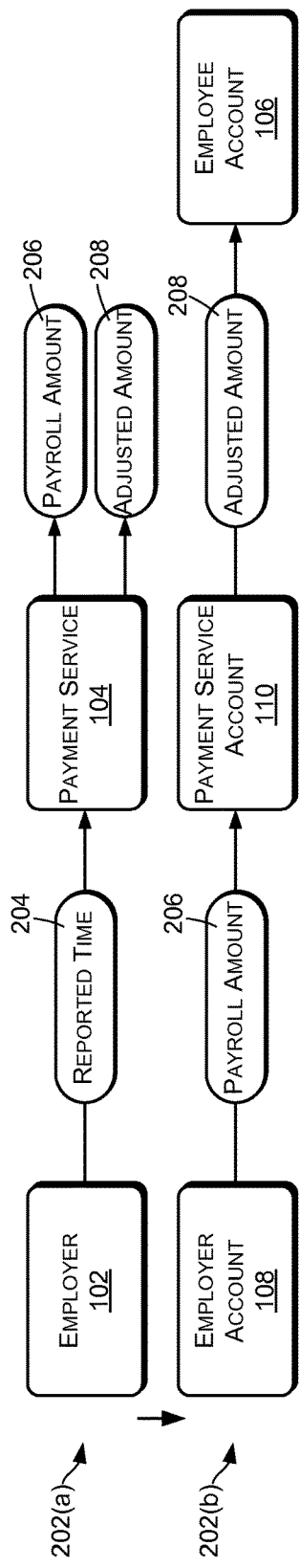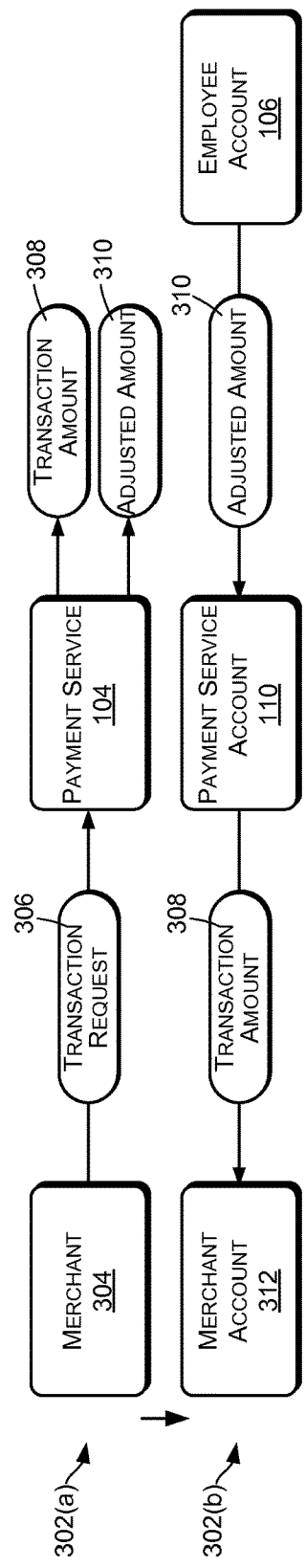

PAYROLL CORRECTION

BACKGROUND

Employees of many businesses are paid based on weekly, biweekly or monthly pay periods. Furthermore, the payment for a particular time period may not be made for several days after the end of the pay period. This lag between the end of the pay period and issuance of a payroll payment is often necessary to allow corrections to time entries and other payroll information. For example, an employer or employee may review records such as time logs after each pay period and may make corrections that affect the amount that is paid to the employee for the pay period.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 is a block diagram illustrating an example sequence of recovering an overage amount from an employee.

FIG. 3 is a block diagram illustrating another example sequence of recovering an overage amount from an employee.

DETAILED DESCRIPTION

Figure 1:
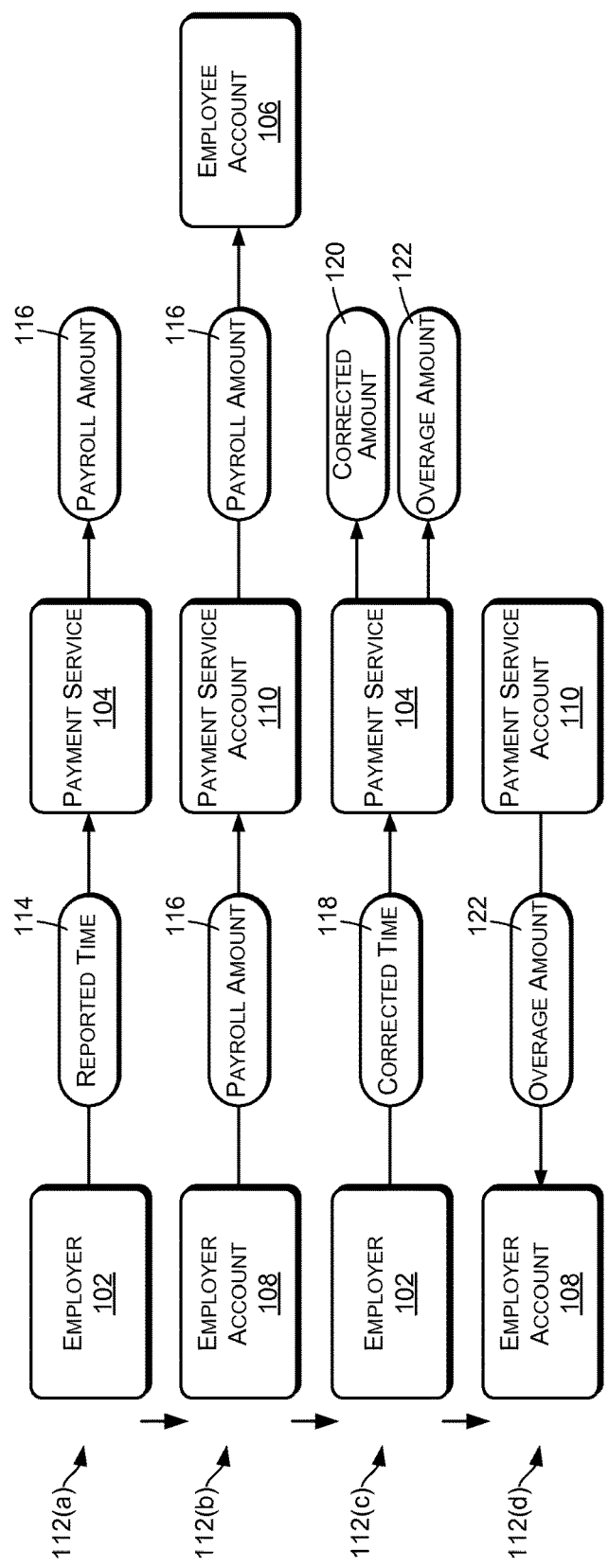
FIG. 1 is a block diagram illustrating an example sequence of paying an employee and of reimbursing an employer for an overage amount.

Some implementations described herein include techniques and arrangements that enable a payment service to make payroll payments to employees on behalf of an employer. In certain embodiments, for example, the payment service may include a payroll service that uses near real-time fund transfers for making payments to an employee on a daily or per-shift basis, immediately or very soon after the end of the employee's shift. For instance, the payroll service may receive an indication of time worked by an employee during a shift, commission earned by the employee during the shift, gratuities received for the employee during the shift, etc. In response, the payroll service may use a near real-time payment technique to send a payroll payment to the employee's bank account. The payroll service may also initiate an electronic transfer of funds from the employer to cover payroll payments made to one or more employees of the employer.

In certain situations it may be determined, after obtaining payroll funds from the employer and sending the payroll payment to the employee, that the amount of the payroll payment was incorrect. This may happen for various reasons such as by an employee forgetting to clock out during a break or at the end of a shift, by an employee continuing to work for a time after clocking out, by incorrect data entry, etc. The error may be discovered by the employee, by the employer, or by a supervisor who works for the employer.

When an error relating to employee compensation is discovered after the payroll payment has been sent, corrected payroll information may be provided to the payroll service and the payroll service may determine a corrected payroll payment amount. In some cases, this may reveal an overage in the amount that has already been paid to the employee, where the amount of the overage is the difference between the original payment amount and the subsequently determined and corrected payment amount.

When a payroll overage has occurred, the payment service may credit the overage amount back to the employer and recoup the overage amount in conjunction with future interactions between the payment service and the employee. For example, the payment service may deduct the overage amount from future payroll payments to the employee. Where the overage amount is small, the entire overage amount may be deducted from the next payroll payment, which may occur on the next work day or after the next work shift of the employee. Where the amount is larger, the overage amount may be deducted in portions or installments from a number of subsequent payroll payments, corresponding to respective work shifts, to minimize the negative impact on the employee's cash flow.

In some cases, the employee may perform work for two or more employers, each of which uses the same payment service for employee payment. In these cases, the payment service may recoup an overage in a payroll payment that has been made on behalf of a first employer by deducting the overage amount from a subsequent payroll payment that is made on behalf of a second employer.

In some cases, the payment service may provide both a payroll service and a purchase transaction payment service to businesses, to enable payment processing for POS transactions. The purchase transaction payment service may include payment processing software, payment processing hardware and/or payment processing services to the merchant to enable the employer to receive payments from buyers when conducting POS transactions with buyers. For example, the purchase transaction payment service may enable a merchant/employer to receive cash payments, payment card payments, and/or electronic payments from buyers for POS transactions.

Data from the purchase transaction payment service may be used by the payment service to determine the amounts of payroll payments that are due to be paid to particular employees of the merchant. For example, the purchase transaction payment service may receive data that indicates time worked by an employee, sales made by the employee, gratuities received for the employee, and so forth. The payment service may receive the data from the purchase transaction payment service to calculate the amount of the payroll payment due to be paid to the employee without any manual action or input from the employer. For example, the payment service may use the data from the purchase transaction payment service to determine whether the employee is due to be paid a sales commission based on the amount of sales made while the employee is logged in to a merchant POS device on which identified sales are generated. Similarly, gratuities may be tracked and credited to the employee. Payroll payments may include commissions and/or gratuities due to be paid to employees based on the work performed by the employees on that same work day.

The purchase transaction payment service may be used by numerous merchants, other than the employee's employer. A particular employee may in some cases make a purchase, as a customer, from another merchant who utilizes the purchase transaction payment service. In this case, a payroll payment overage may be recouped by adding the overage amount to a subsequent purchase by the employee, from a merchant other than the employer, that is processed by the purchase transaction payment service. Depending on the amount of the overage, either the entire overage amount may be added to the purchase transaction or a smaller portion of the overage amount may be added to each of multiple purchase transactions that occur over time.

For discussion purposes, example implementations are described in the environment of a service computing device that provides a payment service, which may include both a payroll service and a purchase transaction payment service. However, implementations herein are not limited to the particular examples provided, and may be extended to other environments, other system architectures, other applications, and so forth, as will be apparent to those of skill in the art in light of the disclosure herein. For example, while some examples are described in an environment of transferring money to a bank account of an employee via several near real-time techniques, other techniques for moving money in near real time may alternatively be used in some environments.

FIG. 1 illustrates an example sequence of transactions that may be performed when facilitating payroll payments on behalf of an employer 102. In this embodiment, the payroll payments are processed and paid by a payment service 104 to an account 106 associated with an employee of the employer 102. More specifically, payroll payments are made from an employer account 108 to a payment service account 110, and from the payment service account 110 to the employee account 106. FIG. 1 shows a sequence of transactions 112, ordered from top to bottom in an example sequence of events. Although FIG. 1 is discussed with reference to reported times worked by the employee, payroll amounts may also be determined based on other factors such as gratuities, commissions, bonuses, and so forth. In addition, payroll amounts may be affected by various types of adjustments for things such as taxes, insurance payments, retirement contributions, and so forth.

In a transaction 112(a), the payment service 104 receives reported time information 114, also referred to herein as payroll processing information, indicating a reported time worked by the employee during a first work shift of the employee. The payment service 104 calculates a payroll amount 116 for the first work shift of the employee based on the reported time information 114, such as by applying an hourly rate to the reported time.

In a transaction 112(b), the payment service 104 initiates a payment from the employer bank account 108 to the payment service account 110, where the payment includes the payroll amount 116. In some cases, this payment may include the combined payroll amounts for multiple employees for one or more work shifts. In other words, payments from the employer 102 to the payment service 104 may in some cases be batched to cover multiple employees and multiple work shifts.

The payment service 104 also initiates a payment of the payroll amount 116 to the employee account 106.

The transaction 112(b) may occur prior to the next work shift of the employee and may in some situations occur immediately or very soon after the work shift for which the employee is being paid. Payment of the payroll amount 116 to the employee account 106 may be made using a near real-time method of funds transfer, as will be describe in more detail below, so that the employee may have nearly immediate access to the payroll amount 116 after completing a work shift.

A transaction 112(c) may occur sometime after the interaction 112(b), and may in some cases occur prior to the next work shift of the employee. The transaction 112(c) may include receiving corrected time information 118 indicating a corrected time worked by the employee during the first work shift. The corrected time information 118 may be provided by the employer 102 as a result of reviewing time records. For example, a supervisor may review reported times after a work shift and may correct time sheets based on personal knowledge or observation. However, this review may not take place until after the employee has been paid the payroll amount 116. Thus, the corrected time information 118 may not be received until after the employee has been paid the payroll amount 116.

The payment service 104 calculates a corrected payroll amount 120 for the first work shift of the employee based on the corrected time information 118. The payment service 104 also calculates an overage amount 122 as the difference between the payroll amount 116 and the corrected payroll amount 120, where it is assumed for purposes of discussion that the corrected time 118 is less than the originally reported time 114.

A transaction 112(d) comprises reimbursing the employer 102 for the overpayment to the employee by initiating a payment of the overage amount 122 from the payment service account 110 to the employer account 108. This payment may constitute an advance to the employer 102, which the payment service 104 will recover from the employee in future transactions. The transaction 112(d) may occur prior to the next work shift of the employee and in some cases may occur immediately or very soon after receiving the corrected time information 118.

FIG. 2 shows a sequence of transactions 202 that may occur after the sequence shown in FIG. 1. The transactions 202 represent one example of how the payment service 104 may recover the overage amount 122 from the employee after paying the overage amount 122 to the employer 102 in the transaction 112(d).

In a transaction 202(a), the payment service 104 receives reported time information 204 indicating a reported time worked by the employee during a second work shift of the employee, wherein the second work shift is the next work shift of the employee after the first work shift discussed above with reference to FIG. 1. The payment service 104 calculates a payroll amount 206 for the second work shift based on the reported time information 204, such as by applying an hourly rate to the reported time. In addition, the payment service 104 calculates an adjusted payroll amount 208 by deducting at least a portion of the payroll overage amount 122 (FIG. 1) from the payroll amount 206 for the second work shift.

In a transaction 202(b), the payment service 104 initiates a payment from the employer bank account 108 to the payment service account 110, where the payment includes the payroll amount 206. In some cases, this payment may include the combined payroll amounts for multiple employees for one or more work shifts, and may therefore comprise a batch payment as already described.

The payment service 104 also initiates a payment of the adjusted payroll amount 208 to the employee account 106.

The portion of the overage amount 122 that has been deducted from the payroll amount 206 is kept by the payment service 104 as repayment or reimbursement for the original overpayment, which has already been refunded to the employer in the transaction 112(d).

The transactions 202 may be repeated for multiple work shifts, with a portion of the overage amount 122 being deducted from the payroll amounts for each of the multiple work shifts.

Note that although the preceding discussion assumes that the employee works the first and second shifts for the same employer, it may be in some cases that the first and second shifts are for two different employers, and the payment service 104 may nevertheless recover overpayments from future payroll payments to the employee, even when such future payroll payments are for work performed for a different employer.

FIG. 3 shows another sequence of transactions 302 that may occur after the sequence shown in FIG. 1. The transactions 302 represent another example of how the payment service 104 may recover the overage amount 122 from the employee after paying the overage amount 122 to the employer 102 in the transaction 112(d). The transactions 302 may be used in conjunction with the transactions 112 of FIG. 1 and may also be used in conjunction with the transactions 202 of FIG. 2.

In the example of FIG. 3, it is assumed that the payment service 104 provides a purchase transaction service to multiple merchants, in addition to the payroll service already discussed. The purchase transaction service supports POS transactions between a merchant 304 and multiple customers. The merchant 304 may comprise the employer 102 or may comprise a different entity.

In this example, it is assumed that the employee, as a customer, is purchasing something from the merchant 304. In a transaction 302(a), the payment service 104 receives a request 306 for a purchase transaction from POS hardware and software of the merchant 304. The transaction request 306 indicates various information, including a transaction amount 308 that is to be paid by the customer/employee to the merchant 304. In response to receiving the transaction request 306, the payment service 104 calculates an adjusted payment amount 310. The adjusted payment amount 310 includes the transaction amount 308 and at least a portion of the overage amount 122 that was previously overpaid to the employee.

In a transaction 302(b), the payment service initiates a payment of the adjusted payment amount 310 from the employee or the employee bank account 106 to the payment service account 110. In addition, the payment service initiates a payment of the transaction amount 308 from the payment service account 110 to a bank account 312 of the merchant 304. The portion of the overage amount 122 that has been added to the transaction amount 308 is kept by the payment service 104 as repayment for the original overpayment to the employee.

The transactions 302 may be repeated for multiple transactions, between the employee and different merchants, with a portion of the overage amount 122 being added to the transaction amount of each transaction.

When the transactions of FIG. 3 are used in combination with the transaction of FIG. 1 and/or FIG. 2, an employer can be reimbursed by the payment service 104 very quickly for payroll overpayments, while the payment service 104 recoups such reimbursements over time from future transactions with overpaid employees.

In some embodiments, certain of the payments illustrated in FIGS. 1 and 2 may be made directly between employer account 108 and the employee account 106, without passing through the payment service 104. For example, the transaction 112(b) may comprise initiating a single transfer of the payroll amount 116 from the employer account 108 to the employee account 106. Portions of the transactions 202(b) and 302(b) may similarly be performed without using the intermediary of the payment service account 110.

Figure 4:
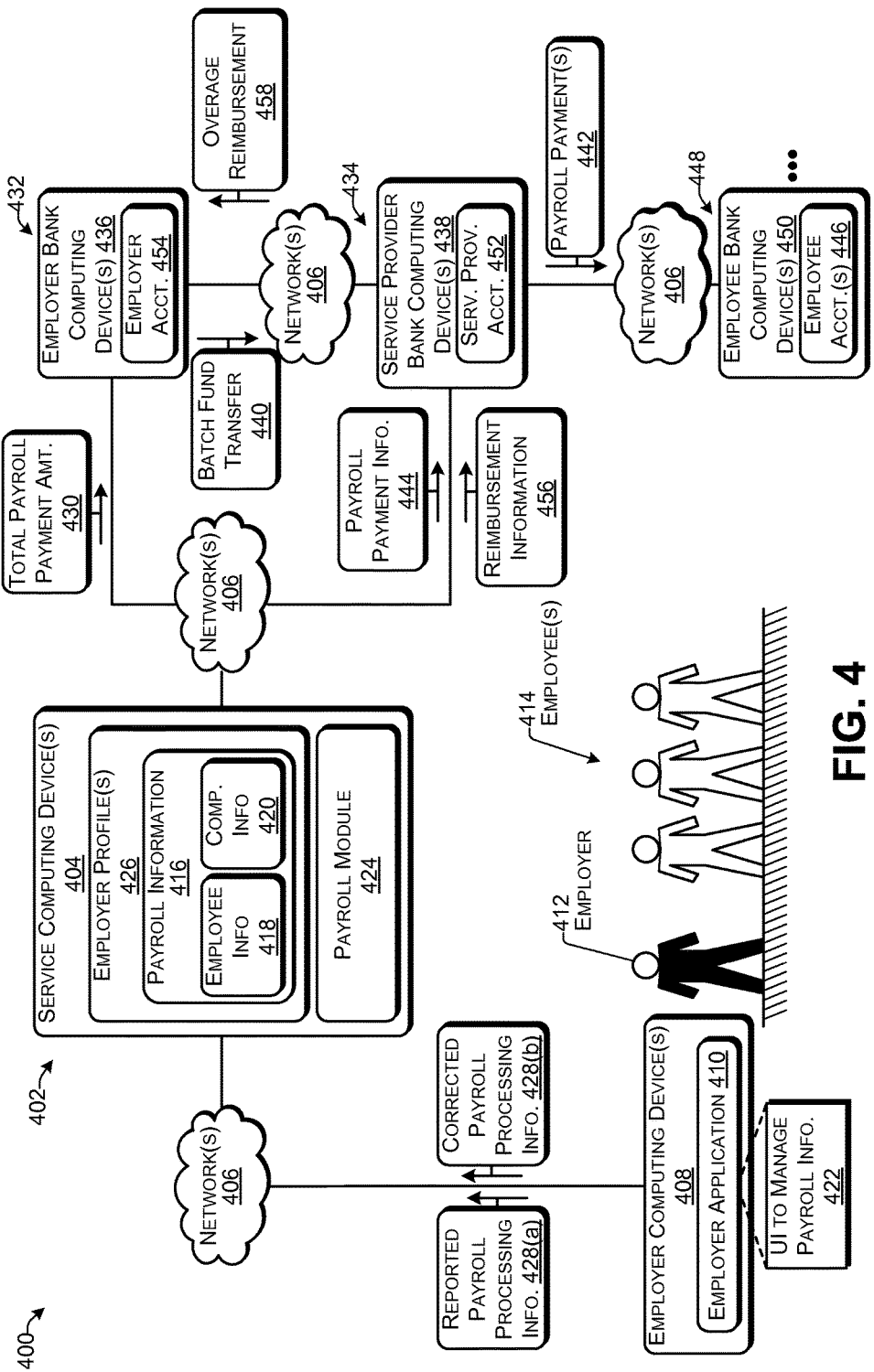
FIG. 4 is a block diagram illustrating an example environment for a payment service according to some implementations.

FIG. 4 illustrates an example environment 400 in which the techniques described above may be implemented. The environment 400 includes a service provider 402 that provides a payment service for making payroll payments to employees on behalf of an employer. For example, one or more service computing devices 404 may be associated with the service provider 402, and may be able to communicate over one or more networks 406 with one or more employer computing devices 408. The service computing device 404 may communicate with an employer application 410 configured to execute on an employer computing device 408.

The employer computing device 408 may be any suitable type of computing device, e.g., portable, semi-portable, semi-stationary, or stationary. Some examples of the employer computing device 408 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

An employer 412 may have a business that employs one or more employees 414. The employer 412 may be any entity that hires employees 414 to perform work. An employee 414 may include any individual hired by an employer 412 to perform work in exchange for payroll payments. In some examples, an employee 414 may include an independent contractor or agent that receives payroll payments from the employer 412.

The employer 412 may make payroll payments to the employees 414 based on payroll information 416. The payroll information 416 may include employee information 418 and compensation information 420. The employee information 418 may include a list of one or more employees of the employer, including employee names or other employee identifiers. The employee information 418 may further include tax information, such as a taxpayer identification number (e.g., Social Security Number (SSN)) for each employee, tax withholding information for federal and state taxes, residence information, bank account information, and so forth.

The compensation information 420 may include an indication of how an employee's compensation is to be calculated, accounting for wages, salary, bonuses, commission, tips or other gratuities, garnishments, and the like. For example, the compensation information 420 may indicate whether a particular employee is paid by the hour or by salary, how much the employee is to be paid, whether the employee is eligible for overtime, whether the employee is eligible for a commission or bonus, whether the employee receives gratuity income, and so forth. Furthermore, the compensation information 420 may include one or more employer-established rules for making payroll payments to the employees, such as conditions under which commissions or bonuses may be paid, rules for distributing gratuity income, and so forth.

In some examples, the employer application 410 may present a user interface (UI) 422 to enable the employer to, among other things, manage the payroll information 416, including the employee information 418 and the compensation information 420. In some examples, the employer application 410 may be a web browser, or the like, that enables the employer 412 to access and manage the payroll information 416 via one or more webpages. In other examples, the employer application 410 may be an application, such as a mobile application or desktop application, that is provided by the service provider 402 or that may be an otherwise dedicated application. Further, in some cases, the employer application 410 may also function as, or may be able to operate concurrently with, a merchant application (not shown in FIG. 4) to enable the employer 412 and/or employees 414 to conduct POS transactions, such as for the sale of goods and/or services (goods and/or services are referred to hereinafter as "items").

The service computing device 404 may include a payroll module 424 that is able to receive employer information from the employer 412, including the payroll information 416 and the compensation information 420. The payroll module 424 may save the employer information in respective employer profiles 426, such that each employer profile 426 may be associated with a respective employer 412. In addition, the payroll module 424 may determine, based at least in part on the payroll information 416 and payroll processing information 428 received from, e.g., the employer computing device 408, amounts of payroll payments due to be paid to each employee, amounts of taxes to withhold for each employee, when to make a payroll payment to each employee, how to make the payroll payments to each employee (check, direct deposit, etc.), and so forth. For example, the payroll processing information 428 received by the payroll module 424 may include amounts of time worked by individual employees over a most recent pay work shift (e.g., in the case that the employees work for an hourly wage), sales totals for individual employees (e.g., in the case that the employees work for sales commissions), gratuity information for individual employees (e.g., in the case that the employees receive gratuities), etc.

In certain cases, the payroll processing information 428 may correspond to a specific work day or work shift during which the employee has performed work for the employer. Furthermore, the payroll processing information 428 may comprise initially reported payroll processing information 428(a) and subsequently submitted corrected payroll processing information 428(b).

In some examples, the reported payroll processing information 428 may be provided automatically by a merchant POS computing device, as discussed additionally below with respect to FIG. 5. For instance, the reported payroll processing information 428(a) may be derived from transaction information and/or time card information received from a merchant POS device. In some cases, the reported payroll processing information 428(a) may be provided based on manual information or entries provided by the employee or the employer during and/or immediately after a work shift.

As one example, suppose that an employee 414 performs work for the employer 412 during a work shift, and that the reported payroll processing information 428(a) is sent to the service computing device 104. The payroll module 424 may receive the reported payroll processing information 428(a) and may determine the amount of a payroll payment to be paid to the employee based on the reported payroll processing information 428(a) for the work shift.

At some time after the employee's work shift, the employee, the employer, a co-employee, or a supervisor may discover that the reported payroll processing information 428(a) is incorrect and may submit corrected payroll processing information 428(b) to the service computing device 104.

Corrections to payroll processing information may be made through the user interface 422 such as by modifying reported hours, gratuities, commissions, sale amounts, etc. In some cases the employer may review the reported payroll processing information 428(a) after the end of a work shift and may note and correct any discovered discrepancies. However, this may occur after the employee has been paid for the shift. In some cases the employee may adjust their hours or other compensation information upon arriving for the next work shift. Other conditions or events may also cause a change in the amount to be paid to the employee.

The payroll module 424 may initially calculate a payroll amount for a work shift based on the initially reported payroll processing information 428(a) and may initiate a payroll payment to the employee 414 based on the initially calculated payroll amount. After receiving the corrected payroll processing information 428(b), the payroll module 424 may recalculate the payroll amount to determine a corrected payroll amount. The payroll module 424 may adjust payroll payments for subsequent work shifts to account for any difference between the initially calculated payroll amount and the corrected payroll amount. For example, the payroll module 424 may determine an overage amount representing the difference between the originally paid payroll amount and the corrected payroll amount. The overage amount may then be deducted from one or more future payroll payments to the employee 414.

In response to determining the amount of payroll payments for multiple employees, which may include deductions for previous overages as described above, the payroll module 424 may determine a total payroll payment amount 430 to send as a request for a transfer of funds from an employer bank 432 to a service provider bank 434. In some examples, the total payroll payment amount 430 may be the total amount of the payroll payments that will be paid for the current payroll period, which may correspond to the most recent work shift. In other examples, the total payroll payment amount 430 may include the total amount of payroll payments for the current payroll period and the total amount of payroll payments for one or more previous payroll periods. For instance, the payment service may pay the employees with a different frequency than the requests for the transfer of funds are submitted to the employer bank 432. As one example, the employees may be paid every day, but a request for transfer of a cumulative total amount of payroll payments might be sent only every week, every two weeks, or the like.

The payroll module 424 may send the total payroll payment amount 430 to one or more employer bank computing devices 436 corresponding to the employer bank 432 to request transfer of funds to the service provider bank 434. Additionally, in some examples, the total payroll payment amount 430 may include an amount of tax withholdings that will be withheld from the payroll payments to be made to the employees, and which will be used for a separate payment of taxes to one or more government entities on behalf of the employees 414. In other examples, the payment service may send a separate request for a separate transfer of funds for the taxes to be paid on behalf of the employees. For instance, the frequency with which the taxes are paid to the government may be different from the frequency with which the employees are paid, and may also be different from the frequency with which funds are requested to be transferred to reimburse the service provider for the payroll payments made to the employees.

In response to receiving the request for transfer of the total payroll payment amount 430, the employer bank computing device 436 may transfer the total amount of the payroll payments to the service provider bank 434, such as to one or more service provider bank computing devices 438. For example, the employer bank 432 may transfer funds to the service provider bank 434 using any suitable money transferring technique, and typically may use a batch-processed transfer of funds. As one example, in the United States, bank-to-bank transfers of funds may be made using a batch fund transfer technique referred to as an ACH (automated clearing house) payment. For example, ACH payments employ a convention adopted by the United States banking industry that includes an electronic network for financial transactions in the United States. ACH includes processing of large volumes of credit and debit transactions in batches. Both the US government and the commercial financial sectors use ACH payments. Rules and regulations that govern the ACH network are established by NACHA (National Automated Clearing House Association) and the Federal Reserve. Further, in other countries, similar batch fund transfer techniques may be employed.

In some examples, the service provider 402 may make payroll payments 442 to the respective employees 414 prior to completion of the batch fund transfer 440 from the employer bank 432 to the service provider bank 434. For example, the payroll module 424 may send payroll payment information 444 to the service provider bank computing device 438 to instruct or otherwise request the service provider bank 434 to send the payroll payments 442 using a payment technique specified by at least one of the employer or the respective employee. The payroll payment information 444 may identify each employee 414 that is to receive a payroll payment for the preceding work shift and may specify the amount of money to be paid to each employee. The payroll payment information 444 may further specify how each employee is to be paid, such as by providing the employee's full name, employee's bank account information, the employee's mailing address and/or various other information about the employee and or the payroll payment to be made to the employee. As one example, the payroll payments 442 may be made by near real-time transfer of money to a respective employee account 446 for each employee 414. As another example, a payroll payment 442 may be made by a check that is mailed to a mailing address of the employee 414, or that is delivered to the workplace of the employee 414 for distribution by the employer 412. As still another example, the payroll payment may be made by direct deposit using a batch fund transfer technique, such as an ACH payment.

In some implementations, the service provider 402 may use a near real-time direct money transfer technique, rather than ACH or other batch processing techniques, for sending payroll payments 442 to the employee account(s) 446.

The service computing device 404 may send an electronic communication that causes the payroll payments 442 to be sent to respective employee accounts 446 in near real-time, e.g., within a matter of seconds or minutes. For instance, notification of the payroll payment 442 may be received by one or more employee bank computing devices 450. In some examples, the payroll payments 442 may be sent via near real-time payment techniques that utilize debit card information associated with the respective employee accounts 446. For example, debit card payments may be used to transfer the payroll payment 442 for receipt in near real-time, e.g., generally within a matter of seconds. Contrasted with ACH or other batch-processed money transfer techniques, which may take several days, the payroll payment 442 made using debit card information of the employees (or other account information enabling near real-time transfer of funds) enables the payroll payment to be received and accessed by the employee on the same day, same hour and/or same minute as when the payroll payment 442 is initiated by the payroll module 424 and/or the service provider bank 434.

The employee information 418 maintained for individual employees may include a debit card number corresponding to the bank account 446 of the respective employee. The service provider bank computing device 438 may be configured to communicate with the one or more computing devices (not shown in FIG. 4) of an interbank network (e.g., Pulse®, Cirrus®) which enable near real-time transfer of funds. For example, the interbank network may enable a single message format for fund transfers whereby the service provider bank computing device 438 may communicate directly or indirectly with the employee bank 448 through the interbank network for sending the payroll payment to the employee bank in near real-time, e.g., often in less than one minute, and typically in a matter of several seconds.

In response to a payroll overpayment to an employee 414, the service provider 402 may send reimbursement information 456 to the service provider bank 434 in order to initiate a reimbursement payment 458 of a payroll overage amount from the service provider bank account 452 to the employer bank account 454. The overage reimbursement may include overages one employee 414 or multiple employees 414.

Using these techniques, employees are able to receive payroll payments on the same day as the day on which the work was performed or very soon after a work shift. In particular, an employee may be paid after every work shift, and the payment for one work shift may be initiated prior to the beginning of the employee's next work shift. In addition, the employer 412 is reimbursed quickly for any detected payroll overpayments, while the payment service assumes the risk of recouping the overpayments from future transactions with the employees 414.

Figure 5:
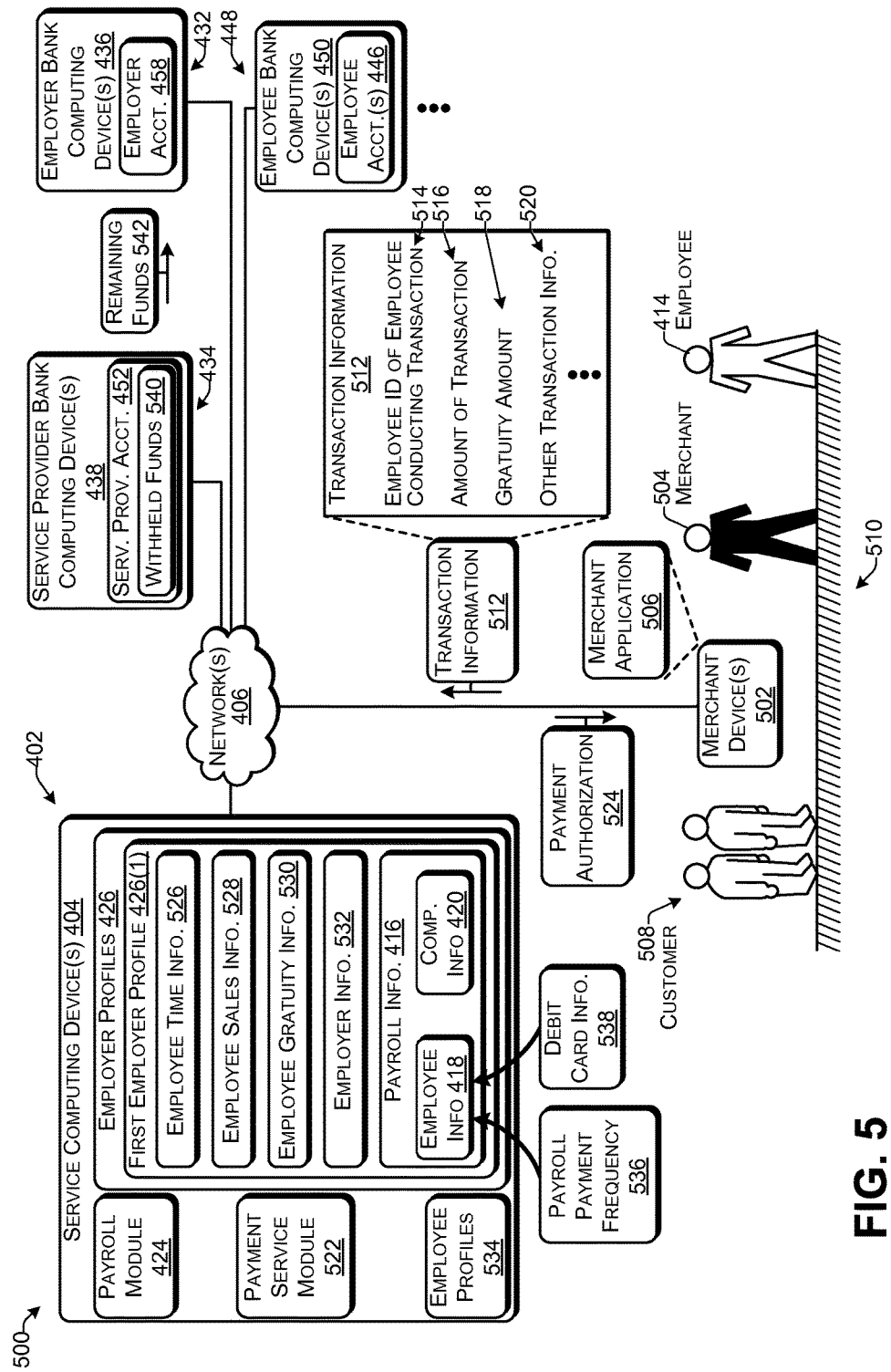
FIG. 5 is a block diagram illustrating an example environment for a payroll and purchase transaction payment service according to some implementations.

FIG. 5 illustrates an example environment 500 for a payroll and purchase transaction payment service according to some implementations. In this example, the service provider 402 provides the payment service as discussed above, and also provides a purchase transaction payment service that enables merchants to conduct point of sale (POS) transactions with customers who acquire items from the merchants. The purchase transaction payment service and the payment service may be able to share information, e.g., information from the purchase transaction payment service may be used to determine at least a portion of compensation due to one or more employees, such as for gratuities, commission, hourly wages, and the like.

In the illustrated example, at least one merchant device 502 is able to communicate over the one or more networks 406 with the one or more service computing devices 404 of the service provider 402. In some examples, the merchant device 502 may be the same computing device as the employer computing device 408 discussed above with respect to FIG. 4. In other examples, the merchant device 502 may be a different computing device. The merchant device 502 may be associated with a merchant 504, which may comprise the employer 412 and/or one or more employees 414 or other agents of the employer 412.

Additionally, in some examples, a plurality of other merchant devices (not shown in FIG. 5) may be associated with a plurality of other merchants who may also participate in the purchase transaction payment service provided by the service provider 402. Each merchant device 502 may include an instance of a merchant application 506 that is executed on the merchant device 502. The merchant application 506 may provide POS functionality to the merchant device 502 to enable the merchant 504 to accept payments from one or more customers 508 at a POS location 510. For example, the merchant 504 may use the merchant device 502 to accept payments through various different types of payment instruments, e.g., payment cards, electronic payment, cash or check, at the POS location 510 from the one or more customer 508. In some cases, a customer 508 may comprise one of the employees 414.

Regardless of the type of payment instrument used, the merchant 504 and the customer 508 may conduct a transaction by which the customer 508 acquires an item from the merchant 504 at the POS location 510. The merchant application 506 on the merchant device 502 may send transaction information 512 to the service computing device 404, e.g., while the transaction is being conducted at the POS location 510. In other examples, such as if the merchant device 502 is processing transactions offline, the transaction information 512 may be sent in a batch at a subsequent point in time or using other suitable techniques.

The transaction information 512 may include an employee identifier 514 associated with the particular employee 414 of the merchant 504 that is conducting the transaction. For example, the employee 414 may login to the merchant device 502 using a pin, a login ID, biometric information, or the like, to provide an indication that the particular transaction is being conducted by the particular employee. In some examples, multiple employees 414 may share a merchant device 502 and may enter a pin, biometric information, or other identifier 514 before each transaction to indicate which employee should receive credit for conducting the particular transaction. The transaction information 512 may further include an amount 516 of the transaction, such as a total amount, amount per item, etc., and may further include a gratuity amount 518 associated with the transaction if any.

The transaction information 512 may include other transaction information 520 such as regarding the time and place of the transaction, information related to the item(s) acquired, a type of payment being used (e.g., cash, check, payment card, electronic payment), as well as additional information, such as buyer identifying information. For instance if a payment card, such as a credit card, debit card, charge card, prepaid card, or the like, is used as a payment instrument, the transaction information 512 can include data stored in the payment card, e.g., Track 1 data (cardholder name, card number and other card information). In addition, when completing the transaction, a customer 508 may sometimes provide an email address for receiving a receipt through email, a phone number for receiving a receipt via text message, or the like. Additional examples of other transaction information 520 that can be captured include detailed item information, e.g., descriptors of the items (size, flavor, color, model, etc.), geolocation data indicating a geographic POS location of a particular transaction, online/offline card data, data describing the merchant 504 and/or the merchant device 502, e.g., a merchant identifier, a merchant category code (MCC), or the like.

A purchase transaction payment service module 522 on the service computing device 404 may receive the transaction information 512 and may associate the transaction information 512 with a particular employer profile 426(1) maintained by the service computing device 404 for the particular employer 412. In addition, if the customer 508 is using a payment instrument, such as a payment card or an electronic payment account, that requires authorization, the purchase transaction payment service module 522 (or, alternatively, the service provider bank 434) may determine whether the payment instrument is authorized to be used to pay for the transaction. As one example, at least a portion of the transaction information 512 (e.g., card information and transaction amount) may be routed by the purchase transaction payment service module 522 (or by the service provider bank 434) through an appropriate card network (e.g., a payment clearing house network) to the cardholder's issuing bank (not shown in FIG. 5). The cardholder's issuing bank responds by approving or declining the transaction, such as after checking that the card information is valid, there is sufficient credit in the cardholder's account, etc. The issuing bank sends a response code back through the card network to the purchase transaction payment service module 522 (or the service provider bank 434). If the payment instrument is authorized, the purchase transaction payment service module 522 (or the service provider bank computing device 438) may send the response code with a payment authorization 524 to the merchant device 502 to indicate to the merchant 504 that payment using the payment instrument has been approved. The merchant device 502 and/or the service provider 402 may store the response code for future use during settlement of the transaction amount. Alternatively, if the issuing bank does not authorize the transaction, then the purchase transaction payment service module 522 (or the service provider bank 434) may send back a message (not shown in FIG. 5) this situation, the customer 508 may need to provide a different form of payment.

In addition, at least a portion of the transaction information 512 may be associated with the employer profile 426(1) corresponding to the particular merchant 504 and employer 412. For example, the transaction information 512 and other information received from the merchant device 502 may be used to determine employee time, employee sales, and/or employee gratuities. Thus, when an employee arrives at work, the employee may log in to the merchant device 502, which may serve the same purpose as punching a time clock, and this login information may be sent to the service computing device 404. Similarly, when the employee leaves for the day, the employee may log out of the merchant device 502, and this logout information may also be sent to the service computing device 404. Accordingly, the service computing device 404 may store employee time information 526 in the first employer profile 426(1) corresponding to the particular merchant 504 and the employer 412. The payroll module 424 may use the employee time information 526 to determine amounts of payroll payments for individual employees of the employer 412, such as based on an amount of time worked by each employee 414.

Additionally, the service computing device 404 may determine employee sales information 528 from the transaction information 512. For example, if an employee works for a commission, such as a percentage of gross sales, the employee sales information 528 may include the aggregated sales (e.g., amounts 516 of transactions) associated with each employee ID 514 per period of time, such as over the past day, past week, past month, etc. Further, in a situation in which multiple employees 414 share a register, each employee can enter a pin before registering one or more sales. The payroll module 424 may determine amounts of payroll payments to be made to individual employees based on one or more payroll rules established by the employer 412, such as the employee is paid an hourly wage plus 10% of gross sales, or other suitable payroll rule. The payroll module 424 may determine the employee's sales commission on a daily or per-shift basis, e.g., after the employee logs out for the day, and may send a payroll payment to the employee's account to pay the employee on the same day as the day on which the work was performed using near real-time payment techniques.

Further, if the employee works in an industry in which tipping is customary, then employee gratuity information 530 may be determined. For example, if the employee works for gratuities as a part of the employee's compensation, the payroll module 424 may determine the gratuity amounts 518 received in association with each employee ID 514 per pay period, such as over the past day, past week, past month, etc., and the payroll module 424 may determine payroll payments to be made to the employee based on one or more payroll rules established by the employer 412, such as the employee gets paid 80% of gross gratuities, with the other 20% going to other employees, or other suitable payroll rule.

Further, the first employer profile 426(1) may include employer information 532, which may include payroll-related information about the employer 412, such as the employer's tax identification number, the employer's bank account information, and so forth. In addition, the first employer profile 426(1) may include the payroll information 416, as discussed above. The payroll information 416 may include the employee information 418 and the compensation information 420, which may be included for each employee 414, and which may be added to the payroll information 416 for the particular employer. Examples of the employee information 418 may include the employee's full name, mailing address, telephone number, email address, taxpayer identifier, date of birth, federal withholding information (e.g., a filled-out IRS Form W-4), state withholding information, employment eligibility information (e.g., completed US Customs and Immigration Service Form I-9), bank account information for receiving payroll payments, and so forth.

In some examples, the service provider 402 may maintain separate employee profiles 534 that may be managed by the respective employees for maintaining and updating at least a portion of the employee information 418. Accordingly, the employee 414 may update the employee information 418 in the employee's own respective employee profile 534, such as by accessing the employee profile 534 through a browser or other application on an employee computing device (not shown in FIG. 5), on the merchant device 502, or the like.

During business operation, e.g., on a daily basis, as the merchant device 502 sends transaction information 512 to the purchase transaction payment service module 522 for a plurality of transactions, the purchase transaction payment service module 522 may construct a log of all the transactions for the merchant 504. Thus, the service provider 402 may receive an indication of an amount of funds that will be received for payments made in association with one or more transactions conducted by the merchant 504. As mentioned above, in the case that customers 508 use payment cards or electronic accounts for making payments to the merchant 504, the service provider bank 434 may act as an acquiring bank for the payments, and the log may include the authorization codes received from issuing banks for respective authorized transactions, as mentioned above. Thus, at the end of each day, the purchase transaction payment service module 522 may provide the authorized transactions to the service provider bank 434, and the service provider bank 434 may transmit the authorizations to the appropriate card network. The card association (e.g., Visa®, MasterCard®, etc.) debits an account of the issuing bank and credits an account of the acquiring bank, i.e., the service provider bank 434. Further, the service provider bank 434 credits the service provider's account 452 in the amount of the authorized transactions.

Additionally, the purchase transaction payment service module 522 may total the sales receipts of all of the transactions for the particular merchant 504 to determine a total sales revenue after taxes and payment processing fees are deducted. For instance, the purchase transaction payment service module 522 may deduct a first percentage from the daily sales revenue as a payment processing service fee. In addition, with authorization from the employer, the payment service may further deduct, as withheld funds 540, a specified percentage from the daily sales revenue to be used for payroll payments, such as for future payroll payments, or as repayment for payroll payments already made. The purchase transaction payment service module 522 may then transfer the remainder of the sales revenue to the employer bank account 454 as remaining funds 542, such as via an ACH batch fund transfer. Accordingly, using this technique, the payment service may receive at least some money for paying the payroll payments in advance, or at least sooner than would be the possible with an ACH fund transfer. Further, in the case that the service provider withholds money in advance, the service provider may save the withheld funds 540 to the service provider account 452 and may offer interest to the employer, or other incentives, to encourage the employer to participate in the withholding of money to be used to pay the payroll payments.

In cases where both an employer and a merchant use the same service provider 402, an employee of the employer may purchase an item from a merchant other than the employer. In situations like this, a payroll overage that has been paid to the employee for a particular work shift, and which has subsequently been reimbursed to the employer as already described, may be recovered by the payment service by adding a corresponding charge to the purchase. The money recovered in this manner may be credited to the employer rather than to the merchant.

Figure 6:
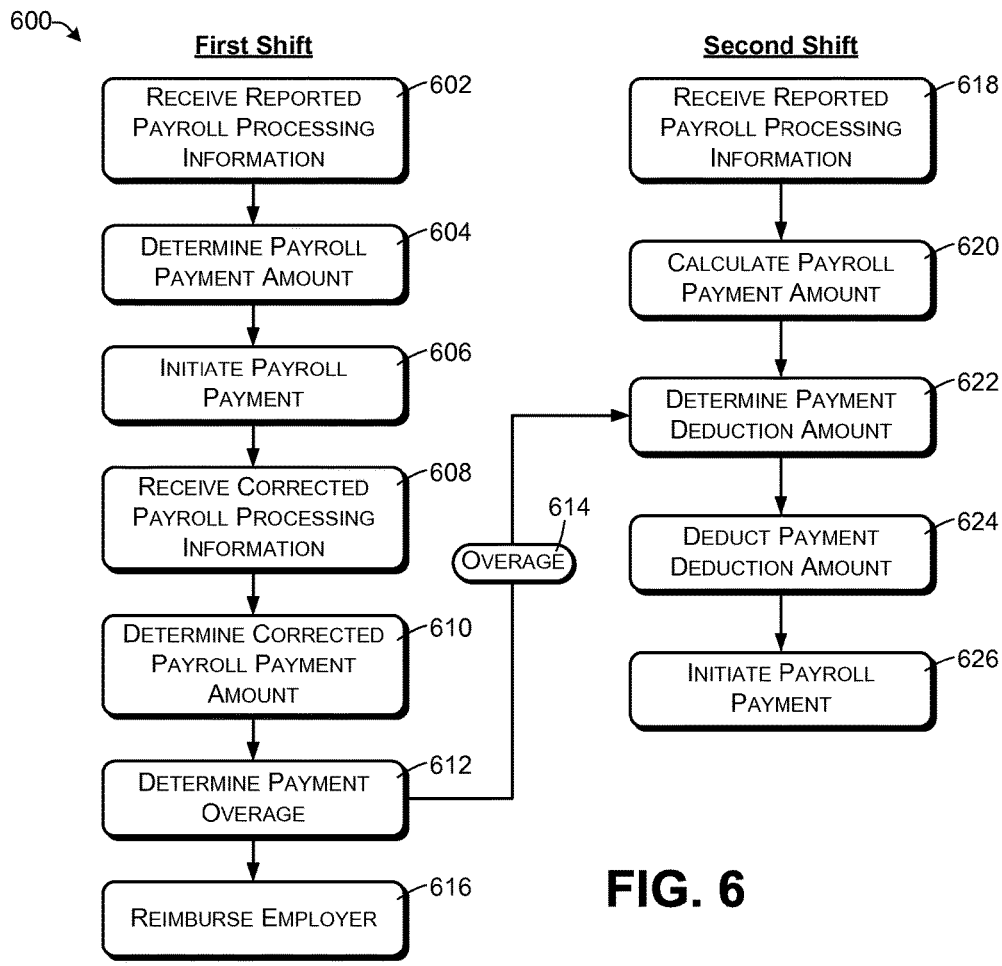
FIG. 6 is a flow diagram illustrating an example process for a payment service according to some implementations.
Figure 7:
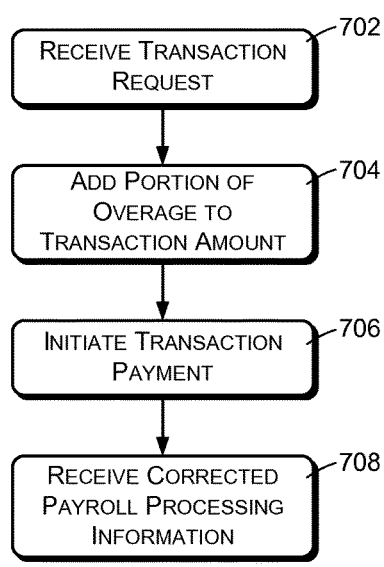
FIG. 7 is a flow diagram illustrating an example process for a payment service according to some implementations.

FIGS. 6 and 7 are flow diagrams illustrating example processes according to some implementations. The processes of FIGS. 6 and 7 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 6 and 7 may be combined with some or all of the operations illustrated in others of FIGS. 1-5. For discussion purposes, the processes are described with reference to the environments, architectures and devices described in the examples herein, although the processes may be implemented in a wide variety of other environments, architectures and devices.

FIG. 6 illustrates an example process 600 that includes adjusting payroll payments to account for overages in previous payroll payments. The example process 600 may be executed by the service computing device 404 of the service provider 402 or by another suitable computing device. For example, the example process 600 may be performed at least in part by the payroll module 424.

The left side of FIG. 6 shows actions that are performed in response to or in conjunction with a first work shift of an employee for an employer. The right side of FIG. 6 shows actions that are performed in response to or in conjunction with a second work shift of the employee for an employer. In the described embodiment, the second work shift is the next work shift of the employee after the first work shift. The first work shift may occur on or may end on a first day, and the second work shift may occur on or may end on a second day.

In many situations, both work shifts may be for the same employer. In some situations, however, the employee may work for a first employer during the first work shift and for a second, different employer during the second work shift, where both of the employers use the same service provider 402.

An action 602 comprises receiving first reported payroll processing information for the first work shift. The first reported payroll processing information may indicate a first reported time worked during the first work shift, a first reported amount of sales made during the first work shift, and/or a first reported amount of gratuities received for the employee during the first work shift. This information may be determined automatically through employee interaction with a POS device, such as based on employee login and logout time, an amount of sales registered using the POS device while the employee was logged in, an amount of gratuities received through the POS device while the employee was logged in, and so forth as described above with reference to FIG. 5. Alternatively, this information may be entered manually by the employer or the employee using the POS device or some other input mechanism such as a webpage.

The first reported payroll processing information may be received by the payroll module 424 immediately or soon after the employee clocks out of a work shift, such as when the employee logs out using the merchant POS device. As already described, the initially reported payroll processing information 428(a) may turn out to be inaccurate and may later need to be corrected.

An action 604 comprises determining a first payroll payment amount to be paid to the employee for the first work shift, based at least in part on the first reported payroll processing information. For example, the payment service may calculate the payroll payment amount based on the reported time worked, whether the employee is due a commission on reported sales, and/or whether any gratuities were reported for the employee. In some examples, the employer may have provided rules on how sales commissions are to be determined, and/or gratuities are to be distributed. The payment service may use these rules to calculate the first payroll payment amount. The payment service may also account for taxes and other deductions to calculate the first payroll payment amount.

In the context of the system shown in FIGS. 4 and 5, the first payroll payment amount is calculated based at least in part on the reported payroll processing information 428(a) and the payroll information 416. For example, the payroll processing information 428 may be used to determine time, sales and/or gratuities attributable to the employee. Alternatively, the reported payroll processing information may be determined from transaction information, including time information (e.g., employee login and logout information), obtained through a purchase transaction payment service as discussed above.

An action 606 comprises initiating a payroll payment of the first payroll payment amount to the employee. The action 606 may comprise initiating a first electronic payment of the first payroll payment amount. More specifically, the action 606 may comprise sending, to a computing device associated with a bank of the payment service, a first request that the first payroll amount be sent to a bank account associated with the employee. This request may comprise a request for a near real-time fund transfer of the first payroll payment amount from a bank account of the payment service to the bank account of the employee. In some examples, an interbank network may be used for transferring the funds, such as by using debit card information associated with the account of the employee.

The action 606 may be performed prior to the second or next work shift of the employee. In some cases, the action 606 may be performed immediately or very soon after the completion of the first work shift. In some cases, the transfer of funds may take place within a 24-hour period, or less, following completion of the first work shift, such as in the case that the employee completes the work late at night, or early in the morning of a following day. In some cases, where the first work shift ends on a first day, the action 606 is performed on the same day or on the next day.

An action 608 comprises receiving corrected payroll processing information for the first work shift. The action 608 occurs after the action 606 of initiating the payroll payment for the first work shift.

The corrected payroll processing information may comprise the same type of information received in the action 602. For example, the corrected payroll processing information may include a corrected time worked by the employee during the first work shift, a corrected amount of sales made by the employee during the first work shift, a corrected amount of gratuities received for the employee during the first work shift, etc. The corrected information may be entered manually by the employee, the employee's supervisor, or by other personnel of the employer. For example, the employer may review payroll information at the end of each day and may correct the information based on actual events observed or noted during the day. As another example, an employee may correct payroll processing information when he or she arrives for a subsequent work shift. Corrections may be entered using the POS device of the employer or by other means such as by accessing a web-based payment service portal.

An action 610 comprises determining a corrected amount of the first payroll payment, based at least in part on the corrected payroll processing information. The corrected payroll payment amount is calculated in the same way as the first reported payroll payment amount, albeit based on the corrected payroll processing information rather than the originally reported payroll processing information.

An action 612 comprises determining a payroll overage amount 614 for the first work shift. The payroll overage amount 614 is the amount by which the first payroll amount exceeds the corrected payroll amount. The payroll overage amount 614 may be calculated by subtracting the corrected payroll payment amount from the first payroll amount.

An action 616 comprises reimbursing the employer or initiating a reimbursement to the employer for the payroll overage amount 614. This may comprise initiating an electronic payment of the overage amount 614 to the bank account of the employer. The action 616 may be performed as seen as the corrected payment payroll information is received and the payroll overage amount 614 is determined, and before the second work shift of the employee. The action 616 may comprise an advance by the payment service of the overage amount, to be collected from the employee over the course of future transactions.

Moving to the right side of FIG. 6, an action 618 comprises receiving second reported payroll processing information for the second work shift. The second reported payroll processing information may indicate the time worked during the second work shift, an amount of sales made during the second work shift, or an amount of gratuities received for the employee during the second work shift. This information may be determined automatically through employee interaction with a POS device, such as based on employee login and logout time, an amount of sales registered using the POS device while the employee was logged in, an amount of gratuities received through the POS device while the employee was logged in, and so forth. In some cases, this information may be entered manually by the employer or the employee using the POS device. In some cases, the employer or the employee may provide this information using other techniques such as by sending the information to the payment service when the employee has completed his or her shift.

An action 620 comprises determining a second payroll payment amount that is due the employee for the second work shift, based at least in part on the second reported payroll processing information. For example, the payment service may calculate the second payroll payment amount based on the reported time worked during the second work shift, whether the employee is due a commission on reported sales made during the second work shift, and/or whether any gratuities were reported for the employee during the second work shift. The action 620 may be performed in the same way as the action 604, based on the second reported payroll payment information.

An action 622 comprises determining a payment deduction amount that is to be deducted from one or more payroll payments that are subsequent to the payroll payment for the first work shift. The payment deduction amount comprises at least a portion of the overage amount 614. In some cases, the payment deduction amount may comprise the entire overage amount 614. In other cases, the payment deduction amount may comprise an installment amount that is a fraction of the overage amount 614, and that will be deducted in installments from multiple payroll payments that are subsequent to the payroll payment for the first work shift.

The payment deduction amount may be calculated in various ways, which may depend on the overage amount. If the overage amount is small, for example, the payment deduction amount may comprise the entire overage amount. If the overage amount is larger, the payment deduction amount may be a fraction of the entire overage amount 614, and may be deducted from multiple future payroll payments.

As one example, an installment amount may be calculated so that deduction of the overage amount 614 is spread over a specified number of future payroll payments. As another example, an installment amount may be calculated as a predetermined percentage of the overage amount 614. In some situations, the installment amount may be limited such that the amount deducted from each future payroll payment does not exceed a given percentage of each payroll payment.

An action 624 comprises deducting the payment deduction amount from the second payroll payment amount to determine an adjusted payroll amount.

An action 626 comprises initiating a second payroll payment of the adjusted payroll amount to the employee. The action 626 may comprise initiating a second electronic payment to the employee. The action 626 may comprise sending, to a computing device associated with the bank of the payment service, a second request that the adjusted amount be sent to the employee's account. The second request may comprise a request for a near real-time fund transfer of the adjusted payment amount from a bank account of the payment service to a bank account of the employee. In some examples, an interbank network may be used for transferring the funds, such as by using debit card information associated with the account of the employee.

Although FIG. 6 shows the actions for two consecutive employee work shifts, the actions on the right side of FIG. 6 may be repeated for any number of consecutive work shifts of the employee. That is, a portion of the overage amount 614 may be deducted from multiple payroll payments subsequent to the first payroll payment. As a specific example, the actions on the right side of FIG. 6 may be repeated for a third work shift that is subsequent to the second work shift, and a portion of the payroll overage amount 614 may be deducted from a third payroll payment amount.

Furthermore, overage amounts resulting from multiple previous work shifts may be deducted from any given payroll payment. That is, given payroll payment may reflect multiple deductions due to multiple overpayments corresponding to respective previous work shifts.

In many cases, the first and second work shifts correspond to work performed by the employee for a single employer. In some cases, however, the first work shift is performed for a first employer and the second work shift is performed for a second, different employer, where both of the employers use the same payment service. In this situation, when deducting an overage amount from a payment for the second work shift, the payment service may credit the deducted amount to the first employer.

FIG. 7 illustrates an example process 700 of adding a payroll payment overage to a purchase transaction made by the employee from a merchant. This example assumes that the employer and the merchant use a common service provider, and that the service provider provides both a payment service and a purchase transaction payment service as described with reference to FIG. 5. The example process 700 may be executed by the service computing device 404 of the service provider 402 or by another suitable computing device.

The process 700 is performed based on the payroll overage amount 614 of FIG. 6. Specifically, the process 700 allows a payroll overpayment to be recovered by adding the amount of the overpayment to the charges for subsequent purchases by an employee from a merchant, even when the merchant is an entity other than the employee's employer. Accordingly, the process 700 may be performed in combination with the process 600 or in place of the actions shown on the right side of FIG. 6.

An action 702 comprises receiving a request for a purchase transaction between a customer and a merchant, wherein the customer comprises the employee that has received the payroll overage amount 614. The merchant may be the employer or may be another entity that uses the service provider 402. The request indicates a transaction amount to be paid by the customer/employee to the merchant for an item.

An action 704 comprises adding at least a portion of the overage amount 614 (FIG. 6) to the transaction amount to produce a payment amount. In some cases, the payment amount may include the entire overage amount 614. In other cases, the payment amount may include only a portion of the overage amount 614. In some cases the amount added to the transaction amount may be limited to a predetermined amount or to a predetermined percentage of the transaction amount. For example, some implementations may limit the added amount to 5% of the transaction amount.

An action 706 comprises initiating payment of the determined payment amount by the employee to the merchant. An action 708 comprises initiating payment of the transaction amount to the merchant. The added portion, corresponding to the overage amount 614, may be credited to the employee's employer to make up for the past overage payment.

Figure 8:
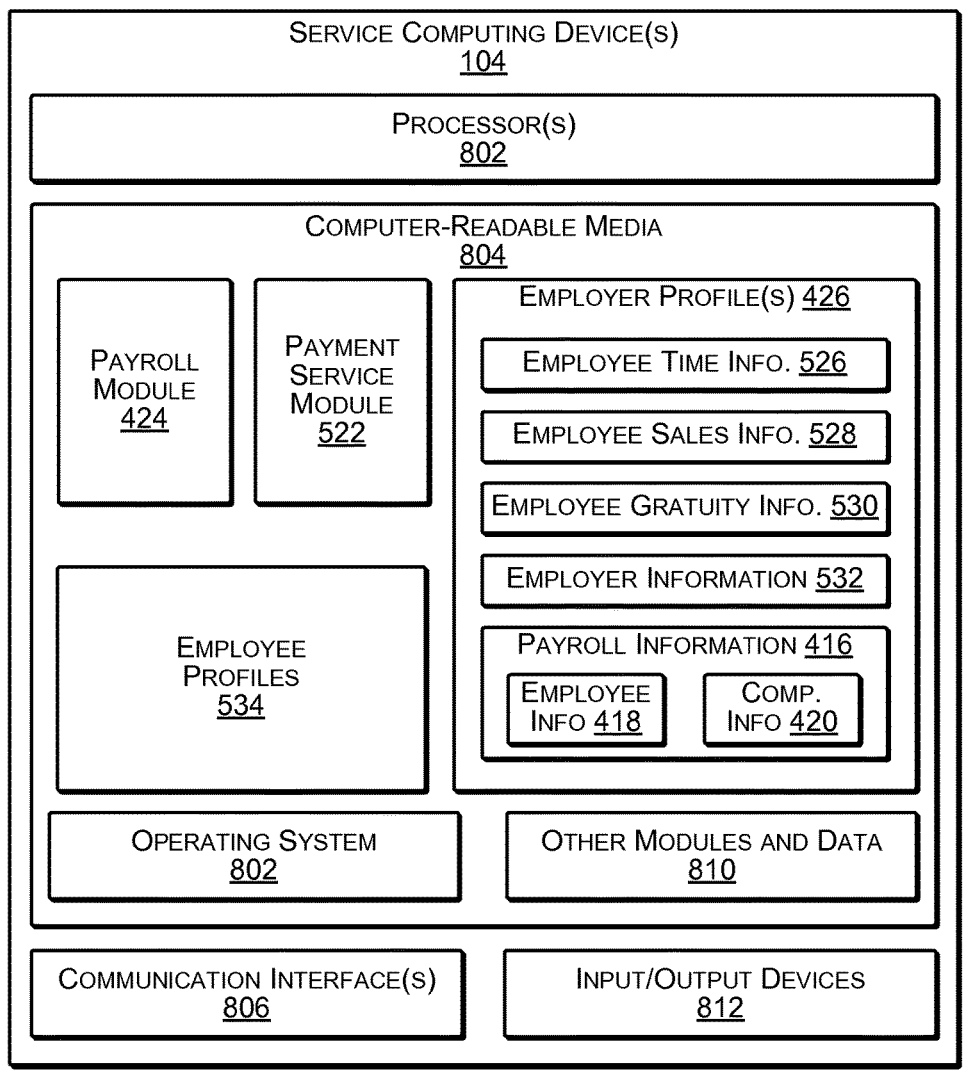
FIG. 8 is a block diagram illustrating select components of one or more example service computing devices according to some implementations.

FIG. 8 illustrates select components of the service computing device 404 that may be used to implement some functionality of the payment service and/or purchase transaction payment service described herein. The service computing device 404 may be operated by a service provider that provides the payment service and/or the purchase transaction payment service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 404 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 404 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service computing device 404 may include one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 904 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 404, the computer-readable media 804 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 104. Functional components stored in the computer-readable media 804 may include the payroll module 424, and the purchase transaction payment service module 522. Additional functional components stored in the computer-readable media 804 may include an operating system 808 for controlling and managing various functions of the service computing device 404.

In addition, the computer-readable media 804 may store data used for performing the operations described herein. Thus, the computer-readable media may store the employer profiles 426, including the employee time information 526, employee sales information 528, employee gratuity information 530, employer information 532, employee profiles 534, and payroll information 416. In addition, the payroll information 416 may include the employee information 418 and compensation information 420. The service computing device 404 may also include or maintain other functional components and data, such as other modules and data 810, which may include programs, drivers, etc., and the data used or generated by the functional components. Further, the service computing device 404 may include many other logical, programmatic and physical components, of which those described above are merely examples that are related to the discussion herein.

The communication interface(s) 806 may include one or more interfaces and hardware components for enabling communication with various other devices, such as over the network(s) 406. For example, communication interface(s) 806 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device 404 may further be equipped with various input/output (I/O) devices 812. Such I/O devices 812 may include a display, various user interface controls (e.g., buttons, joystick, keyboard, mouse, touch screen, etc.), audio speakers, connection ports and so forth.

Although the subject matter has been described in language specific to features and/or methodological acts, it is to be understood that the subject matter defined in the appended claims is not necessarily limited to the specific features or acts described. Rather, the specific features and acts are disclosed as example forms of implementing the claims.

What is claimed is:

1. A system associated with a payment service, the system comprising:
    a payroll application available via the payment service, the payroll application being installed on a computing device of an employer and configuring the computing device to manage payroll on behalf of one or more employees via the payment service; and
    one or more server computing devices associated with the payment service, the one or more server computing devices including:
        one or more processors; and
        one or more computer-readable media storing instructions executable by the one or more processors, wherein the instructions program the one or more processors to perform actions comprising:
            storing compensation information associated with the one or more employees, the compensation information indicating how the one or more employees are compensated by at least the employer and at least one other employer that subscribes to the payment service;
            receiving, from the payroll application, first payroll processing information indicating a first reported time worked by a first employee of the one or more employees, the first reported time having been worked during a first work shift of the first employee for the employer;
            calculating a first payroll amount for the first work shift of the employee based at least in part on the first reported time and the compensation information;
            performing, at a first time, a first payroll payment for the first payroll amount based at least in part on:
                transferring the first payroll amount from a bank account of the employer to a bank account of the payment service; and
                transferring the first payroll amount from the bank account of the payment service to a bank account of the first employee;
            receiving, at a second time after the first time, corrected payroll processing information indicating a first corrected time worked by the employee during the first work shift based on an interaction between the first employee and the payment service;
            determining a first corrected payroll amount for the first work shift based at least in part on the first corrected time and the compensation information;
            subtracting the first corrected payroll amount from the first payroll amount to determine a first payroll overage amount that was paid to the first employee for the first work shift;
            prior to a second work shift of the first employee, transferring the first payroll overage amount from the bank account of the payment service to the bank account of the employer;
            receiving, from another payroll application executable on another computing device associated with the other employer, second payroll processing information indicating a second reported time worked by the employee at the other employer, the second reported time having been worked during the second work shift of the first employee for the other employer;
            calculating a second payroll amount for the second work shift of the first employee based at least in part on the second reported time and the compensation information; and
            performing a second payroll payment based at least in part on:
                transferring the second payroll amount from a bank account of the other employer to the bank account of the payment service;
                determining, based at least in part on the second payroll amount, to collect at least a portion of the second payroll amount as reimbursement for the first payroll overage amount; and
                transferring a reduced second payroll amount from the bank account of the payment service to the bank account of the first employee, the reduced second payroll amount corresponding to the second payroll amount less the first payroll overage amount.

2. A method, comprising:
    receiving, at one or more servers associated with a payment service system and from a first instance of a payroll application installed on a first computing device of a first employer, first payroll information associated with one or more employees of the first employer, the payroll application configuring the first computing device to manage payroll on behalf of the one or more employees of the first employer via the payment service system;
    storing, at the one or more servers, compensation information associated with an employee of the one or more employees, the compensation information indicating how the employee is compensated by the first employer;
    determining, by the one or more servers and based at least in part on the compensation information and the first payroll information, a first payroll amount for work performed by the employee during a first work shift of the employee for the first employer;
    receiving, at the one or more servers, a fund transfer of the first payroll amount from an account of the first employer to an account of the payment service system;
    prior to a second work shift of the employee, initiating, by the one or more servers, a first near real-time fund transfer to transfer the first payroll amount via an interbank network from the account of the payment service system to an account of the employee, wherein the second work shift is a work shift of the employee later than the first work shift;
    determining, by the one or more servers, a corrected payroll amount for work performed by the employee during the first work shift;
    determining, by the one or more servers, a payroll overage amount associated with the first work shift by which the first payroll amount exceeds the corrected payroll amount;
    determining, by the one or more servers, a reported time worked by the employee during the second work shift of the employee;

determining, by the one or more servers and based at least in part on the compensation information, a second payroll amount for work performed by the employee during the second work shift;

deducting, by the one or more servers, at least a portion of the payroll overage amount of the first work shift from the second payroll amount to determine a first adjusted amount; and initiating, by the one or more servers, a second near real-time fund transfer to transfer the first adjusted amount via the interbank network from the account of the payment service system to the account of the employee.

3. The method of claim 2, further comprising:

receiving, at the one or more servers and from an instance of a merchant application installed on a second computing device of a merchant, a request for a purchase transaction between a customer and the merchant, wherein the merchant application configures the second computing device to process one or more purchase transactions between one or more customers and the merchant via the payment service system, the customer comprises the employee, and the request indicates a transaction amount to be paid by the customer to the merchant;

receiving, at the one or more servers and from the instance of the merchant application, payment of a payment amount by the employee, wherein the payment amount includes the transaction amount and at least an additional portion of the payroll overage amount; and initiating, by the one or more servers, payment of the transaction amount to the merchant.

4. The method of claim 2, further comprising:

determining, by the one or more servers and based at least in part on the first payroll information, a first indication including at least one of:
- a reported amount of time worked by the employee during the first work shift;
- a reported amount of sales attributed to the employee during the first work shift; or
- a reported amount of gratuities received for the employee during the first work shift; and determining, by the one or more servers, a second indication including at least one of:
- a corrected amount of time worked by the employee during the first work shift;
- a corrected amount of sales attributed to the employee during the first work shift; or
- a corrected amount of gratuities received for the employee during the first work shift, wherein determining the first payroll amount is further based at least in part on the first indication, and wherein determining the corrected payroll amount is based at least in part on the second indication.

5. The method of claim 2, further comprising:

determining, by the one or more servers, an installment amount, wherein the installment amount is a fraction of the payroll overage amount and the portion of the payroll overage amount is equal to the installment amount; and deducting, by the one or more servers, the installment amount from each of multiple payroll amounts that are for respectively corresponding work shifts subsequent to the first second work shift.

6. The method of claim 2, wherein:

the first work shift ends on a particular day; and initiating the first near real-time fund transfer is performed on the particular day or on a next day.

7. The method of claim 2, further comprising:

receiving, at the one or more servers associated with the payment service and from a second instance of the payroll application installed on a second computing device of a second employer that is different from the first employer, second payroll information associated with one or more employees of the second employer, the payroll application configuring the second computing device to manage payroll on behalf of the one or more employees of the second employer via the payment service system, and the second work shift being performed for the second employer; and determining, by the one or more servers, the second payroll amount based at least in part on the compensation information and the second payroll information.

8. A method comprising:

receiving, at a payment service system and from a first instance of a payroll application installed on a first computing device of a first employer, first payroll information associated with one or more employees of the first employer, the payroll application configuring the computing device to manage payroll on behalf of the one or more employees via the payment service system;

initiating, by the payment service system, a first electronic payment of a first amount from an account of the payment service system to an account of an employee of the one or more employees for work performed by the employee during a first work shift for the first employer, the first amount being determined based at least in part on the first payroll information;

determining, by the payment service system, a corrected amount of the first work shift;

determining, by the payment service system, an overage amount by which the first amount exceeds the corrected amount;

initiating, by the payment service system, a second electronic payment of at least a portion of the overage amount from the account of the payment service system to an account of the first employer;

determining, by the payment service system, a second amount to be paid to the employee for work performed by the employee during a second work shift after the first work shift;

determining, by the payment service system, a third amount to be paid to the employee based at least in part on the second amount and the at least the portion of the overage amount; and initiating, by the payment service system, a third electronic payment of the third amount from the account of the payment service system to the account of the employee.

9. The method of claim 8, wherein:

the second work shift is a next work shift of the employee after the first work shift; and initiating the first electronic payment is performed prior to the second work shift.

10. The method of claim 8, further comprising:

receiving, at the payment service system and from an instance of a merchant application installed on a second computing device of a merchant, a request for a purchase transaction between a customer and the merchant, wherein the merchant application configures the second computing device to process one or more purchase transactions between one or more customers and the merchant via the payment service system, the customer comprises the employee, and the request indicates a transaction amount to be paid by the customer to the merchant; and initiating, by the payment service system, a fourth electronic payment of a fourth amount from the account of the employee, wherein the fourth amount includes the transaction amount and at least an additional portion of the overage amount.

11. The method of claim 8, further comprising:
determining, by the payment service system and based on the first payroll information, a first indication of at least one of:
- a reported amount of time worked by the employee during the first work shift,
- a reported amount of sales attributed to the employee during the first work shift, or
- a reported amount of gratuities received for the employee during the first work shift;

receiving, by the payment service system, a second indication of at least one of:
- a corrected amount of time worked by the employee during the first work shift,
- a corrected amount of sales attributed to the employee during the first work shift, or
- a corrected amount of gratuities received for the employee during the first work shift; and determining, by the payment service system, the first amount based at least in part on the first indication,
wherein determining the corrected amount is based at least in part on the second indication.

12. The method of claim 8, further comprising:
determining, by the payment service system, an installment amount, wherein the installment amount is a fraction of the overage amount, the portion of the overage amount being equal to the installment amount; and
deducting, by the payment service system, the installment amount from each of multiple electronic payments that are for respectively corresponding work shifts subsequent to the second work shift.

13. The method of claim 8, wherein:
the first work shift ends on a particular day; and
initiating the first electronic payment is performed on the particular day or on a next day.

14. The method of claim 8, wherein:
the second work shift is performed by the employee for a second employer.

15. The method of claim 8, wherein initiating the first electronic payment comprises sending a request for a near real-time transfer of money to the account of the employee.

16. The system of claim 1, wherein:
the first payroll processing information further indicates at least one of:
- a reported amount of sales attributed to the employee during the first work shift; or
- a reported amount of gratuities received for the employee during the first work shift; and the corrected payroll processing information further indicates at least one of:
- a corrected amount of sales attributed to the employee during the first work shift; or
- a corrected amount of gratuities received for the employee during the first work shift.

17. The system of claim 1, further comprising:
receiving, from the payroll application, third payroll processing information indicating a third reported time worked by a second employee of the one or more employees, the third reported time having been worked during a third work shift of the second employee for the employer;
calculating a third payroll amount for the third work shift of the second employee based at least in part on the third reported time and the compensation information;
completing, at a third time, a third payroll payment for the third payroll amount based at least in part on:
  transferring the third payroll amount from a bank account of the employer to a bank account of the payment service; and
  transferring the third payroll amount from the bank account of the payment service to a bank account of the second employee;
receiving, at a fourth time after the third time, corrected payroll processing information indicating a second corrected time worked by the second employee during the third work shift based on an interaction between the second employee and the payment service;
determining a second corrected payroll amount for the third work shift based at least in part on the second corrected time and the compensation information;
subtracting the second corrected payroll amount from the third payroll amount to determine a second payroll overage amount that was paid to the second employee for the third work shift; and
transferring the second payroll overage amount from the bank account of the payment service to the bank account of the employer.

18. The system of claim 17, further comprising a merchant application installed on another computing device of a merchant, the merchant application configuring the other computing device to (i) process transactions between one or more customers and the merchant on behalf of the payment service and (ii) send transaction data associated with the transactions to the payment service.

19. The system of claim 18, further comprising:
receiving, from the merchant application, transaction data associated with a transaction between a customer of the one or more customers and the merchant, the customer being the second employee and the transaction data indicating a transaction amount of the transaction;
calculating an adjusted transaction amount for the transaction, the adjusted transaction amount being based on the transaction amount and the second payroll overage;
receiving, from the merchant application, payment data associated with a payment instrument to satisfy the adjusted transaction amount; and
completing the transaction based at least in part on:
  transferring the adjusted amount from a bank account of the second employee to the bank account of the payment service;
  determining, based at least in part on the adjusted transaction amount, to collect at least a portion of the adjusted transaction amount as reimbursement for the second payroll overage amount; and
  transferring the transaction amount from the bank account of the payment service to a bank account of the merchant.

* * * * *

UNITED STATES PATENT AND TRADEMARK OFFICE
CERTIFICATE OF CORRECTION

PATENT NO. : 10,083,489 B1
APPLICATION NO. : 14/591839
DATED : September 25, 2018
INVENTOR(S) : Amir Nathoo et al.

Page 1 of 1

It is certified that error appears in the above-identified patent and that said Letters Patent is hereby corrected as shown below:

Column 23, Line 65, change "to the first second work shift." to -- to the second work shift --.

Column 26, Line 01, change "The system of claim 1, further comprising:" to -- The system of claim 1, the actions further comprising: --.

Column 26, Line 45, change "The system of claim 18, further comprising:" to -- The system of claim 18, the actions further comprising: --.

Signed and Sealed this
Fourth Day of December, 2018

Andrei Iancu
*Director of the United States Patent and Trademark Office*